3,038,003
PROCESS FOR THE MANUFACTURE OF α-CHLORO-β-AMINO CARBOXYLIC ACID DERIVATIVES
Andor Fürst, Basel, and Emilio Kyburz, Riehen, Switzerland, and Stefano Majnoni, Milan, Italy, assignors to Hoffmann-La Roche Inc., Nutley, N.J., a corporation of New Jersey
No Drawing. Filed Oct. 22, 1958, Ser. No. 768,846
Claims priority, application Switzerland Oct. 25, 1957
12 Claims. (Cl. 260—482)

This invention relates to a method for the production of compounds having the general formula

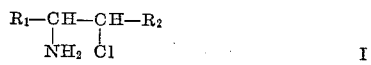

I wherein $R_1$ represents hydrogen, alkyl, cycloalkyl, aryl or aralkyl and $R_2$ represents cyano, carboxyl, carbamyl, N-hydroxycarbamyl or carbalkoxy, and salts thereof in high yields. The method comprises treating a compound having the general formula

II wherein $R_1$ and $R_2$ have the same significance as above, with liquid ammonia. The reaction product may be converted to its acid salt by treatment with an acid and/or esterified by treatment with an esterifying agent, if $R_2$ does not already represent an ester group.

Typical radicals represented by $R_1$ include such alkyl groups as lower alkyl groups, e.g. methyl, ethyl, propyl, isopropyl, butyl and the like; cycloalkyl groups such as cyclopentyl and cyclohexyl; monocyclic aryl groups such as phenyl, p-nitrophenyl, etc.; and phenyl lower alkyl groups such as benzyl and the like. Preferred groups represented by $R_2$ are lower carbalkoxy groups such as carbomethoxy, carbethoxy, carbopropoxy, carbisopropoxy, carbobutoxy, etc.

Preferred starting materials are the lower alkyl esters of α-chloroacrylic acid and of α-chlorocrotonic acid, especially the methyl, ethyl and isopropyl esters.

If the symbol $R_2$ in Formula II represents a carbomethoxy group, then the principal reaction product is the acid amide. In the case of the higher homologous esters, such as the ethyl, propyl, isopropyl or butyl esters, however, the ester group generally remains unchanged in the reaction.

The compounds form acid addition salts by reaction with inorganic or organic acids such as the mineral acids, e.g. hydrochloric acid, hydrobromic acid, hydroiodic acid, sulfuric acid, phosphoric acid, etc., oxalic acid, arylsulfonic acids, e.g. benzenesulfonic acid, toluenesulfonic acid, etc.

The products may be esterified by treatment with an esterifying agent such as alcoholic mineral acids, e.g. hydrochloric acid in ethanol, sulfuric acid in methanol, etc.

In order to prevent polymerization, polymerization inhibitors such as hydroquinone, p-phenylenediamine, diphenylamine, phenyl-β-naphthylamine, may be added to the reaction mixture.

Instead of compounds having the Formula II, such readily obtainable substances as α,β-dichloro compounds having the general formula

III wherein $R_1$ and $R_2$ have the same significance as above, may be used as starting materials. By treatment with liquid ammonia, the compounds of Formula III are converted at first into the corresponding compounds having the general Formula II. Then, as the reaction continues, they are converted to the compounds of Formula I.

The compounds of this invention are useful as intermediates for the preparation of α-amino-β-hydroxycarboxylic acids or esters thereof, e.g. serine or serine methyl ester, α-amino-β-chloro carboxylic acids, e.g. α-amino-β-chloropropionic acid, and 4-amino-3-isoxazolidone as well as 5-substituted derivatives thereof.

The compounds of Formula I can be converted into the corresponding α-amino-β-hydroxy-carboxylic acid derivatives by treatment with sodium hydroxide as described in Angew. Chem. 68, 462 (1956). The α-amino-β-hydroxy-carboxylic acid derivatives thus obtained, especially the esters, may be transformed to α-amino-β-chloro-carboxylic acid derivatives according to the methods disclosed in Ber. 40, 3717 (1907). The α-amino-β-chloro-carboxylic acid derivatives may be converted to 4-amino-3-isoxazolidone or a 5-substituted derivative thereof according to the methods disclosed in Helvetica Chimica Acta 40, 1531–1552 (1957).

The following examples are illustrative of the invention. All temperatures are expressed in degrees centigrade.

*Example 1*

78 grams of methyl α,β-dichloropropionate were slowly dropped into one liter of liquid ammonia. The reaction mixture was stirred for 3 hours and then evaporated to dryness. The residue, cooled to 0°, was treated with 150 cc. of cold 30% alcoholic hydrochloric acid. After standing for 15 hours, the reaction mixture was treated with 250 cc. of absolute alcohol while stirring and then filtered. The residue was extracted several times with boiling absolute alcohol. From the combined filtrates there was obtained by concentration α-chloro-β-aminopropionamide hydrochloride which was crystallized from alcohol, M.P. 145–146°.

When starting from ethyl α,β-dichloro-propionate there was obtained in an analogous manner ethyl α-chloro-β-amino-propionate hydrochloride which melted at 104–106°. If isopropyl α,β-dichloropropionate was used as starting material, isopropyl α-chloro-β-aminopropionate hydrochloride was obtained; M.P. 91–92°.

32 grams of α-chloro-β-amino-propionamide hydrochloride were refluxed for 4 hours in 300 cc. absolute methanol while introducing hydrogen chloride. The solution was evaporated to 150 cc. and the precipitated ammonium chloride was filtered off. The filtrate was evaporated to dryness, taken up in 35 cc. of absolute methanol, then filtered. The filtrate was treated with 300 cc. of absolute ether and cooled to −15°. Crystalline methyl α-chloro-β-amino-propionate hydrochloride was obtained which, after recrystallization, melted at 101–103°.

10 grams of α-chloro-β-amino-propionamide hydrochloride were refluxed with 400 cc. of 4 N hydrochloric acid. The solution was evaporated to dryness. The residue was dissolved in 6 cc. of water and neutralized with 4 N lithium-hydroxide solution. The α-chloro-β-aminopropionic acid formed was precipitated by addition of 150 cc. of ethanol; M.P. 161–162°.

*Example 2*

To one liter of liquid ammonia were added 41 grams of methyl α-chloro-acrylate and the mixture was permitted to stand overnight. It was then evaporated to dryness. While cooling with ice, 90 cc. of 30% alcoholic hydrochloric acid were added and stirring was continued for 30 minutes. The crystalline residue comprising α-chloro-β-amino-propionamide hydrochloride was filtered and recrystallized from alcohol-ether.

If ethyl α-chloro-acrylate was treated in an analogous manner with liquid ammonia there was obtained ethyl α-chloro-β-amino-propionate.

Starting from isopropyl α-chloro-acrylate isopropyl α-chloro-β-amino-propionate was obtained.

We claim:

1. A process for the production of a compound represented by the formula $$R_1-CH-CH-R_2$$
$$\phantom{R_1-}|\phantom{CH-}|$$
$$\phantom{R_1-CH}NH_2\ Cl$$

wherein $R_1$ represents a member of the group consisting of hydrogen, lower alkyl, cycloalkyl, monocyclic aryl and monocyclic aryl-lower alkyl, and $R_2$ represents a member of the group consisting of carboxyl, carbamyl and carbo-lower alkoxy, which comprises reacting a compound represented by the formula $$R_1-CH=C-R_3$$
$$\phantom{R_1-CH=}|$$
$$\phantom{R_1-CH=C}Cl$$

wherein $R_1$ has the same significance as above and $R_3$ is carbo-lower-alkoxy with liquid ammonia.

2. A process for the production of an acid addition salt of a compound represented by the formula $$R_1-CH-CH-R_2$$
$$\phantom{R_1-}|\phantom{CH-}|$$
$$\phantom{R_1-CH}NH_2\ Cl$$

wherein $R_1$ represents a member of the group consisting of hydrogen, lower alkyl, cycloalkyl, monocyclic aryl and monocyclic aryl-lower-alkyl, and $R_2$ represents a member of the group consisting of carboxyl, carbamyl and carbo-lower alkoxy, which comprises reacting a compound represented by the formula $$R_1-CH=C-R_3$$
$$\phantom{R_1-CH=}|$$
$$\phantom{R_1-CH=C}Cl$$

wherein $R_1$ has the same significance as above and $R_3$ is carbo-lower-alkoxy with liquid ammonia and reacting the product with acid to form the acid addition salt.

3. A process for the production of a compound represented by the formula $$R_1-CH-CH-R_2$$
$$\phantom{R_1-}|\phantom{CH-}|$$
$$\phantom{R_1-CH}NH_2\ Cl$$

wherein $R_1$ represents a member of the group consisting of hydrogen, lower alkyl, cycloalkyl, monocyclic aryl and monocyclic aryl-lower alkyl, and $R_2$ represents a member of the group consisting of carboxyl, carbamyl and carbo-lower alkoxy, which comprises reacting a compound represented by the formula $$R_1-CH-CH-R_3$$
$$\phantom{R_1-}|\phantom{CH-}|$$
$$\phantom{R_1-CH}Cl\ \ Cl$$

wherein $R_1$ has the same significance as above and $R_3$ is carbo-lower-alkoxy with liquid ammonia.

4. A process for the production of an acid addition salt of a compound represented by the formula $$R_1-CH-CH-R_2$$
$$\phantom{R_1-}|\phantom{CH-}|$$
$$\phantom{R_1-CH}NH_2\ Cl$$

wherein $R_1$ represents a member of the group consisting of hydrogen, lower alkyl, cycloalkyl, monocyclic aryl and monocyclic aryl-lower alkyl, and $R_2$ represents a member of the group consisting of carboxyl, carbamyl, and carbo-lower-alkoxy, which comprises reacting a compound represented by the formula $$R_1-CH-CH-R_3$$
$$\phantom{R_1-}|\phantom{CH-}|$$
$$\phantom{R_1-CH}Cl\ \ Cl$$

wherein $R_1$ has the same significance as above and $R_3$ is carbo-lower-alkoxy with liquid ammonia and reacting the product with acid to form the acid addition salt.

5. A process for the production of a compound represented by the formula $$R_1-CH-CH-CO-O-C_nH_{2n+1}$$
$$\phantom{R_1-}|\phantom{CH-}|$$
$$\phantom{R_1-CH}NH_2\ Cl$$

wherein $R_1$ represents a member of the group consisting of hydrogen, lower alkyl, cycloalkyl, monocyclic aryl and monocyclic aryl-lower-alkyl wherein $n$ is a whole number greater than 1 which comprises reacting a compound represented by the formula $$R_1-CH=C-CO-O-\text{lower alkyl}$$
$$\phantom{R_1-CH=}|$$
$$\phantom{R_1-CH=C}Cl$$

wherein $R_1$ and $n$ have the same significance as above, with liquid ammonia.

6. A process for the production of a compound represented by the formula $$R_1-CH-CH-CO-O-C_nH_{2n+1}$$
$$\phantom{R_1-}|\phantom{CH-}|$$
$$\phantom{R_1-CH}NH_2\ Cl$$

wherein $R_1$ represents a member of the group consisting of hydrogen, lower alkyl, cycloalkyl, monocyclic aryl and monocyclic aryl-lower alkyl wherein $n$ is a whole number greater than 1 which comprises reacting a compound represented by the formula $$R_1-CH-CH-CO-O-\text{lower alkyl}$$
$$\phantom{R_1-}|\phantom{CH-}|$$
$$\phantom{R_1-CH}Cl\ \ Cl$$

wherein $R_1$ and $n$ have the same significance as above, with liquid ammonia.

7. A process for the production of α-chloro-β-aminopropionamide which comprises reacting methyl α,β-dichloropropionate with liquid ammonia.

8. A process for the production of ethyl α-chloro-β-amino-propionate which comprises reacting ethyl α,β-dichloropropionate with liquid ammonia.

9. A process for the production of isopropyl α-chloro-β-amino-propionate which comprises reacting isopropyl α,β-dichloropropionate with liquid ammonia.

10. A process for the production of α-chloro-β-aminopropionamide which comprises reacting methyl α-chloroacrylate with liquid ammonia.

11. A process for the production of ethyl α-chloro-β-amino-propionate which comprises reacting ethyl α-chloroacrylate with liquid ammonia.

12. A process for the production of isopropyl α-chloro-β-amino-propionate which comprises reacting isopropyl α-chloro-acrylate with liquid ammonia.

References Cited in the file of this patent

UNITED STATES PATENTS

| | | |
|---|---|---|
| 2,441,130 | Bernstein et al. | May 17, 1948 |
| 2,738,363 | Godefroi | Mar. 13, 1956 |
| 2,754,322 | Anspon | July 10, 1956 |

FOREIGN PATENTS

| | | |
|---|---|---|
| 404,744 | Great Britain | Jan. 25, 1934 |

OTHER REFERENCES

Crowwell et al.: J.A.C.S., vol. 65, pp. 312–15 (1943).

UNITED STATES PATENT OFFICE
CERTIFICATE OF CORRECTION

Patent No. 3,038,003            June 5, 1962

Andor Fürst et al.

It is hereby certified that error appears in the above numbered patent requiring correction and that the said Letters Patent should read as corrected below.

Column 4, lines 16 to 18, and lines 31 to 33, extreme right-hand portion of each formula, for "-lower alkyl", each occurrence, read -- $-C_nH_{2n+1}$ --.

Signed and sealed this 20th day of November 1962.

(SEAL)
Attest:

ERNEST W. SWIDER
Attesting Officer

DAVID L. LADD
Commissioner of Patents